SHIFT REGISTER CONTROLLED ANALOG MEMORY SYSTEM

Filed Nov. 14, 1966 7 Sheets-Sheet 1

INVENTOR.
JOHN A. RADO,
BY
Walter J. Adam
ATTORNEY.

SHIFT REGISTER CONTROLLED ANALOG MEMORY SYSTEM

Filed Nov. 14, 1966 7 Sheets-Sheet 3

Nov. 11, 1969 J. A. RADO 3,478,323

SHIFT REGISTER CONTROLLED ANALOG MEMORY SYSTEM

Filed Nov. 14, 1966 7 Sheets-Sheet 4

Nov. 11, 1969 J. A. RADO 3,478,323

SHIFT REGISTER CONTROLLED ANALOG MEMORY SYSTEM

Filed Nov. 14, 1966 7 Sheets-Sheet 7

1

3,478,323
SHIFT REGISTER CONTROLLED ANALOG MEMORY SYSTEM

John A. Rado, Los Angeles, Calif., assignor to Hughes Aircraft Company, Culver City, Calif., a corporation of Delaware Filed Nov. 14, 1966, Ser. No. 594,121
Int. Cl. G11b 9/00
U.S. Cl. 340—173 8 Claims

ABSTRACT OF THE DISCLOSURE

A scan converter system wherein analog data signals are stored and read from a matrix of capacitive, FET type, storage elements or circuits. FET type gates are associated in the matrix with each storage element and are responsive to column and row shift registers or delay devices to allow selection of individual elements for scanning in any desired sequence. A feedback network is coupled to each element and the analog signal source. The system is capable of writing and reading, either sequentially or concurrently, at the same or different scanning rates, and with the same or with geometrically different angular relationships.

This invention relates to scan converters and particularly to a reliable data conversion system in which scanning or selection of storage elements may be performed at a relatively high speed and in which write and read scan control is provided in an improved and simplified manner.

In conventional scan conversion systems, information such as analog data is stored in tubes having a storage surface of dielectric material in the form of a sheet or film for storing a charge pattern. For retaining data over a relatively long period of time, the dielectric-type storage tube is required which characteristically has limitations as to the resolution and dynamic range obtainable from data read therefrom. Another problem characteristic with vacuum tube scanning arrangements is that limitations of electron optics cause variations from true linearity resulting in recording and reading of data from erroneous positions on the tube surface, or in a loss of geometric fidelity. All conventional storage tubes require high voltage sources and relatively complex and well-regulated control sources. For some uses and environments, glass vacuum tubes are undesirable because of being subject to breakage.

In arrangements where both reading and writing are performed simultaneously, such as in some radar processor systems, a double ended storage tube is required. As is well known in the art, double ended storage tubes require sources of relatively high voltage, extensive control circuits, and complex accessory circuits.

It is therefore an object of this invention to provide a simplified and reliable scan converter.

It is another object of this inveition to provide a data conversion or scanning system utilizing connected conductive paths so as to maintain perfect geometric fidelity when selecting lines of data to be scanned.

It is still another object of this invention to provide a scan converter system that is suitable for printed circuit and solid state techniques.

It is a further object of this invention to provide a scan converter system controlled and operated by relatively small voltage levels.

It is a still further object of this invention to provide a scan converter system operable at very high read and write speeds.

2

It is a further object of this invention to provide a scan conversion system in which the read and write speeds may be simply and reliably selected to have a desired ratio.

Briefly, the scan converter systems in accordance with the principles of the invention include storage elements into and out of which data is switched by a matrix of coincidence or "AND" gates. Storage capacitors having buffer arrangements for providing non-destructive read-out may form the storage elements. A write data bus and an output bus are coupled to the "AND" gates on each side of the storage capacitors. Shift register or delay circuits control the "AND" gates to effect reading and writing by proper selection of the storage elements. Writing and reading may be sequential or concurrent, at the same or different scanning rates and may be geometrically at the same or different angular relationships.

The novel features of this invention, as well as the invention itself, will best be understood from the accompanying description taken in connection with the accompanying drawings, in which like characters refer to like parts, and in which.

Figure 1:
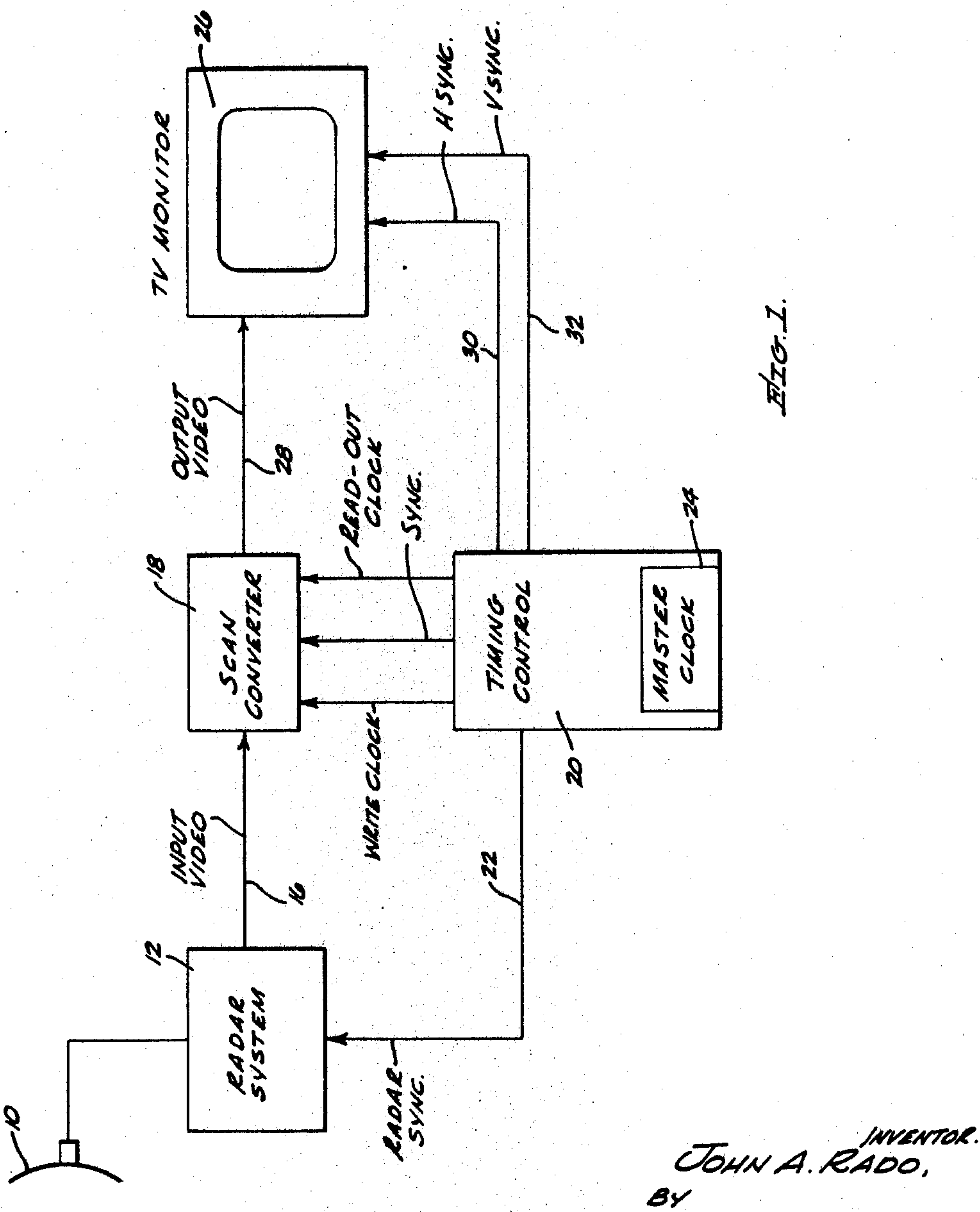
FIG. 1 is a schematic block diagram of a typical system utilizing the scan converter system in accordance with the principles of the invention.

Referring first to FIG. 1, a typical application of the scan converter system of the invention is in a radar type arrangement having an antenna 10 responsive to radar signals received from a radar system 12 which may include a conventional transmitter, receiver and duplexer. For example, pulses of energy may be transmitted into space at a selected pulse repetition rate with return signals being received in response to each radar sweep or transmitted pulse. The antenna 10 may be rotating so that information is sequentially received from different azimuth or angular positions. The energy from each transmitted pulse is reflected from targets and returning energy is applied to the radar system 12 where it is received and detected to form video signals as is well known in the art. In some arrangements, a coherent transmitter and receiver may be utilized so that the Doppler history of the received signal may be processed to sharpen the beam of the transmitted signal. The video signal, which may be an analog signal of a relatively low frequency is applied through a lead 16 to a scan converter 18 of a type in accordance with the principles of the invention. A timing control source 20 applies synchronizing pulses on a lead 22 to the radar system which may be related to the main trigger pulses by being concurrent or prior in time. The timing source 20 may include a master clock 24 which controls the synchronizing pulses for triggering of the transmitted pulses as well as applies write clock, readout clock and synchronizing signals to the scan converter 18. A monitor 26 which may be a TV (television) monitor may be utilized to display the output video signal after being read from the scan converter 18 on a lead 28. The monitor 26 may receive horizontal and vertical synchronizing signals on respective leads 30 and 32 from the timing control circuit 20 for controlling the sequence of the display formation. It is to be understood that although FIG. 1 shows the scan converter operable in a radar type system, the principles of the invention are equally applicable to operation in television systems, data monitoring systems or in any system in which data is to be recorded and then read out either in the same or different coordinate systems and with any desired write-to-read time relation.

Figure 2:
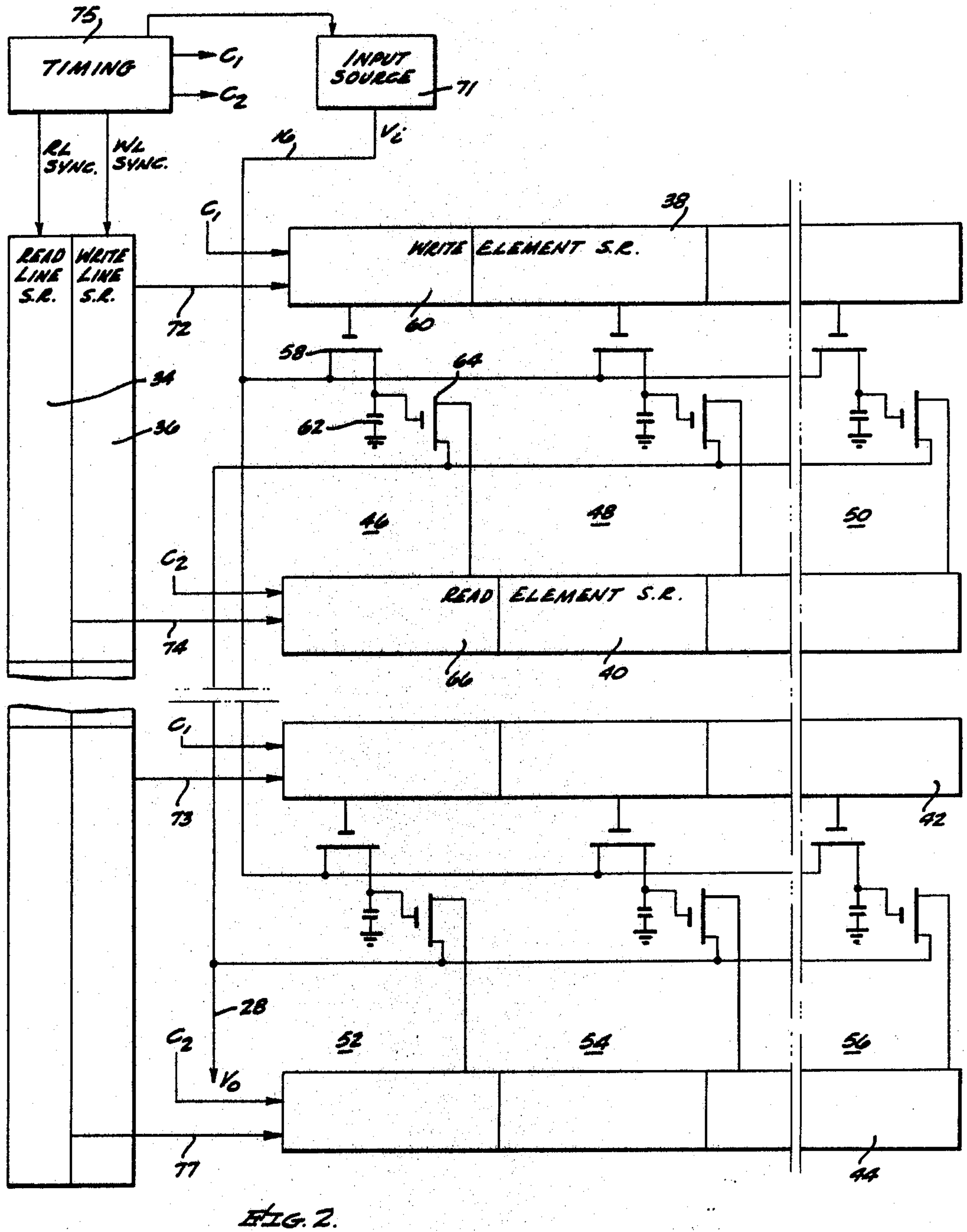
FIG. 2 is a schematic circuit and block diagram of a scan converter system in accordance with the invention operable for concurrently performing writing and reading of data.

Referring now to FIG. 2, a scan or data conversion system in accordance with the invention includes a read line shift register 34 and a write line shift register 36 which select lines of elements in the vertical dimension. In the element or horizontal dimension a pair of shift registers is provided for each line such as write element shift register 38 and read element shift register 40 for the first line and write element shift register 42 and read element shift register 44 for the last line. The line and element designations may respectively be azimuth and range dimensions in the radar system of FIG. 1, for example. The first and second lines respectively include elements 46, 48 and 50 and elements 52, 54 and 56. It is to be understood that the principles of the invention are applicable to any desired numbers of lines with each line including any predetermined number of elements. Each storage element such as 46 may include a field effect transistor (FET) 58 having a gate electrode coupled to a stage 60 of the write element shift register 38 and having a source electrode coupled to the signal input line 16 for receiving the input signal $V_i$. A second or drain electrode of the transistor 58 is coupled through a storage capacitor 62 to ground as well as to the gate electrode of a field effect transistor 64 having a drain electrode coupled to a first stage 66 of the read element shift register 40 and a source electrode coupled to the lead 28 for applying a readout signal $V_o$ thereto. Each storage element such as 48, 50, 52, 54 and 56 may be similar to element 46. In order to provide simplified construction to the arrangement of FIG. 2, each element such as 46 and the adjacent shift register stages 60 and 64 may be formed as a unit or block, for example.

In operation, the write shift register 36 applies a synchronizing pulse to a selected line such as 72 and to the shift register 38 which in turn applies a negative pulse to the gate electrode of the field effect transistor 58. The voltage on the lead 16 is sampled and stored on the capacitor 62. An input source 71, which may be any suitable source such as the radar system 12 of FIG. 1, provides the input signal in a predetermined time relation with a timing source 75. The shift registers 34 and 36 may be controlled by respective read and write line synchronizing pulses applied thereto from the timing source 75. Other elements of the first line such as the element 48 are selected for writing in response to the clock pulse $C_1$ derived from the timing source 75. For reading, a synchronizing pulse is applied from the shift register 34 through a lead 74 and the stage 66 of the shift register 40 applies a negative pulse to the transistor 64 so that the voltage on the capacitor 52 is sampled and gated to the output lead 28. The transistor 64 operating as a source follower transfers the voltage from the gate to the source substantially without current loss, thus acting as a buffer circuit. For sampling other elements of the first line, the read shift register 40 responds to clock pulses $C_2$. In the system of FIG. 2, writing and reading may be concurrently performed in different or in the same lines or vertical positions or performed in orthogonal dimensions. For sequential writing and reading, the writing and reading may also be performed in the same or in opposite or orthogonal dimensions. For example, writing may be performed in the horizontal dimension which stored information may represent the signal returns from a plurality of range sweeps. After sufficient data is accumulated, reading is then performed along each vertical or azimuth position line by controlling the read synchronizing pulses to energize all of the read shift registers 40 and 44 and then applying the clock signal $C_2$ to all read shift registers.

Figure 3:
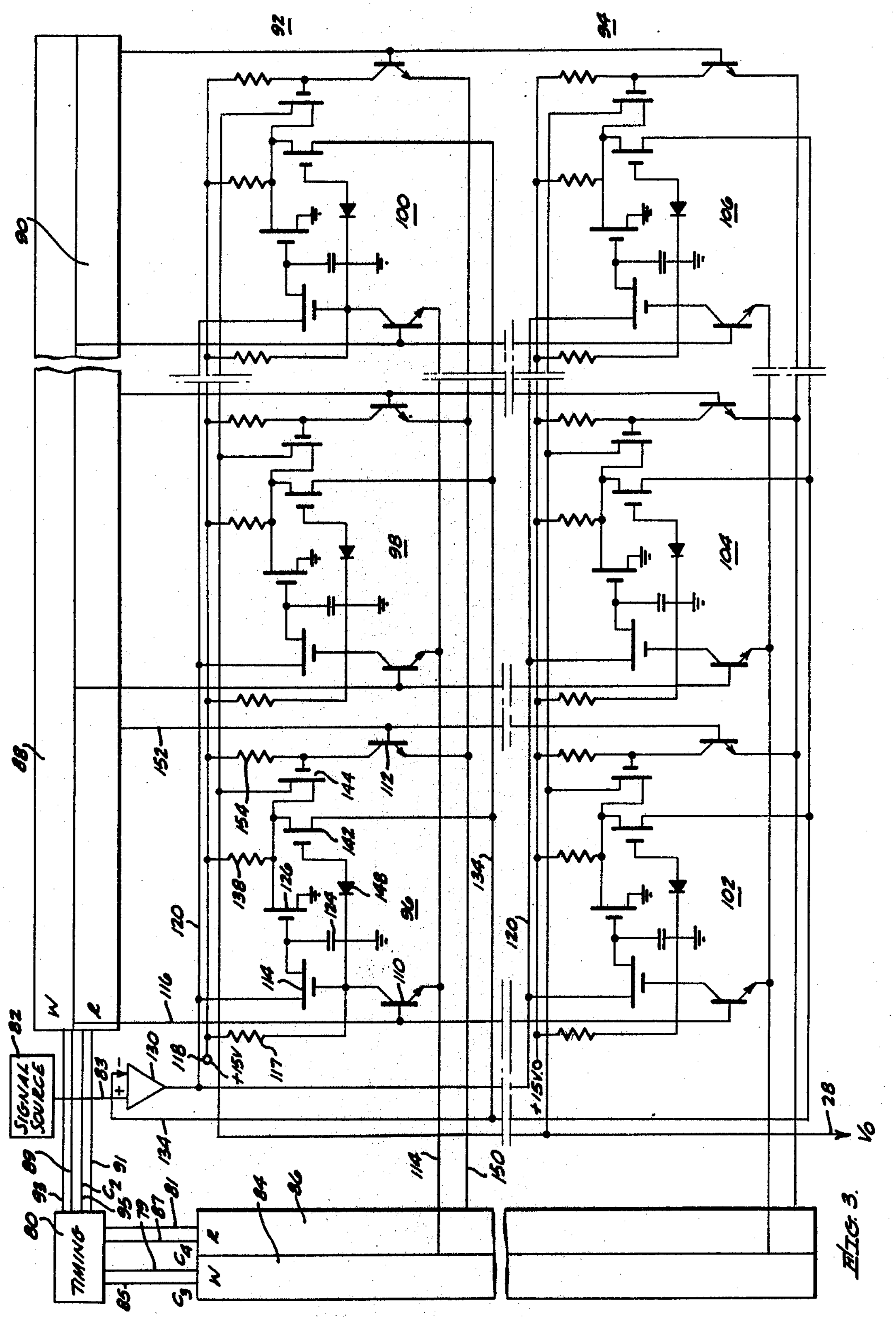
FIG. 3 is a schematic circuit and block diagram of another scan converter system in accordance with the invention, operable for concurrently performing writing and reading of data.

Referring now to FIG. 3, another scan converter system in accordance with the principles of the invention operable to provide concurrent reading and writing of data will be explained. Write and read line (vertical) shift registers 84 and 86 and write and read element (horizontal) shift registers 88 and 90 provide selection of elements in either of two dimensions. For convenience of illustration, only lines 92 and 94 are shown respectively having elements 96, 98 and 100 and elements 102, 104 and 106. The shift registers 84 and 86 each respond to a synchronizing pulse on respective leads 79 and 81 and to clock pulses $C_3$ and $C_4$ applied on respective leads 85 and 87 from a timing source 80 to independently select lines for writing or for reading. The shift registers 88 and 90 also independently respond to synchronizing pulses on respective leads 89 and 91 and clock pulses $C_1$ and $C_2$ on respective leads 93 and 95 to select elements in conjunction with the line selection operation for writing and for reading.

A typical element such as 96 includes a write "AND" gate transistor 110 of the npn type having an emitter coupled to a write line or vertical selection lead 114 and a base coupled to a write element or vertical selection lead 116. The collector of the transistor 110 is coupled to the gate electrode of a field effect transistor 114 as well as through a resistor 117 to a +15 volt terminal 118. The transistor 114 has a first electrode coupled to a lead 120 and a second electrode coupled to a storage capacitor 124 and to the gate electrode of a field effect transistor 126. The other end of the capacitor 124 is coupled to a suitable reference potential such as ground. The lead 120 is coupled to the output terminals of a high gain differential amplifier 130 having as inputs a video input signal $V_i$ on a lead 83 from an input signal source 82 and a feedback signal on a lead 134 sampled from the storage capacitor 124 during the write operation. The lead 83 may correspond to the lead 16 of FIG. 1. The purpose of the high gain differential amplifier is to minimize and correct errors which would result from voltage offsets in the gates and buffer. These voltage offsets are primarily due to variations in the characteristics of the transistor 126 and its counterparts included in each of the various storage elements, such as the storage element 96. The buffer transistor 126 coupled as a source follower has a first electrode or drain coupled to ground and a second electrode or source coupled through a resistor 138 to the +15 volt terminal 118, to a first electrode of a field effect transistor 142 and to a first electrode of a field effect transistor 144. The gate electrode of the transistor 142 is coupled through the anode to cathode path of a diode 148 to the collector of the transistor 110. The gate electrode of the transistor 144 is coupled to the collector of a read "AND" gate transistor 112 of the npn type having an emitter coupled to a read line 150 and a base coupled to an element select lead 152. The collector of the transistor 112 is also coupled through a resistor 154 to the +15 volt terminal 118. For providing a feedback signal during writing, the second electrode of the transistor 142 is coupled to the lead 134. For reading, the second electrode of the transistor 144 is coupled to the output lead 28. Each of the elements 98, 100, 102, 104 and 106 is similar to the element 96 and will not be separately explained.

In operation, an analog signal is applied to the input lead 83 while selection pulses are applied to the lead 114, and a line or vertical position such as 92 and an element 96 is selected in response to a pulse on the lead 116. The transistor 110 is biased into conduction which in turn biases the transistor 114 to a conductive state and biases the transistor 142 into conduction, the transistor 142 operating as a switch. A signal difference is applied from the amplifier 130 through the transistor 114 to store a charge on the capacitor 124 having a predetermined and pre-corrected proportional amplitude relationship to that of the input signal. It is to be noted that the stored charge is not necessarily proportional to the sampled input but is of such value that, after being coupled through buffer and readout gates, it applies the proper voltage to the output lead 28.

Writing is performed at each element in any desired sequence such as vertically along each line. During reading, the shift registers 86 and 90 select lines or elements either in the same or in an orthogonal dimension from that during writing, in response to control pulses from the timing source 80. The transistor 112 of the element 96, for example, is biased into conduction which in turn biases the switch 144 into conduction, and the voltage on the capacitor 124 is sampled and applied to the output lead 28. It is to be noted that the stored voltage is read non-destructively and is only changed in response to a writing operation. An alternative arrangement, in which the buffer is omitted, could be read out destructively, if desired.

Figure 4:
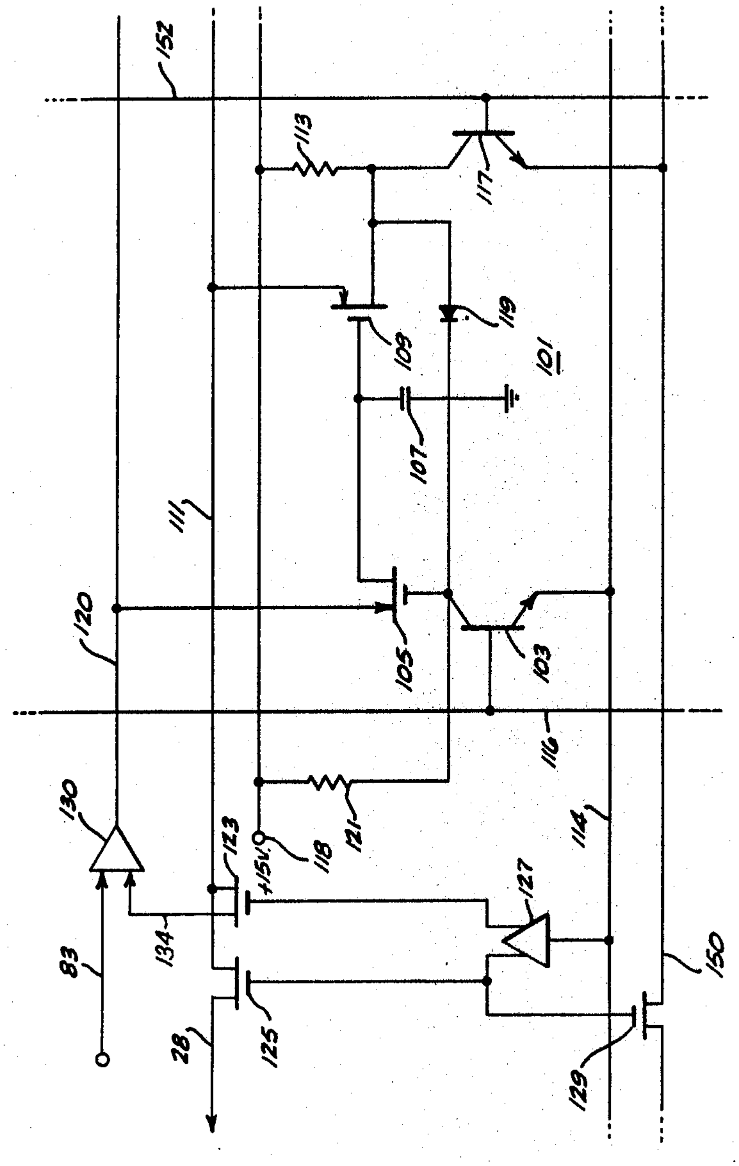
FIG. 4 is a schematic circuit diagram of a scan converter system similar to that of FIG. 3 except utilizing a common output and feedback line in accordance with the principles of the invention.

Referring now to FIG. 4, an arrangement is shown in accordance with the principles of the invention, generally operable in the system of FIG. 3 and in which the buffer element is switched to a common output and feedback line. A storage element 101 is shown which may be coupled in the shift register selection lines of FIG. 3 at all element positions such as at the element 96. A write "AND" gate transistor 103 of the npn type has a base coupled to the lead 116, an emitter coupled to the lead 114 and a collector coupled to the gate electrode of a field effect transistor 105. The source electrode of the transistor 105 is coupled to the lead 120 and the drain electrode is coupled to the gate electrode of a buffer transistor 109 as well as to one end of a storage capacitor 107 having the other end coupled to ground.

The buffer transistor 109 has a source electrode coupled to a lead 111 which is a common output and feedback lead for a particular horizontal line of elements such as line 92 of FIG. 3. The drain electrode of the transistor 109 is coupled through a resistor 113 to the +15 volt terminal 118, and to the collector of a read "AND" gate transistor 117 which may be of the npn type. The base of the transistor 117 is coupled to the lead 152 and the emitter is coupled to the lead 150. A diode 119 has an anode to cathode path coupled between the drain of the transistor 109 and the collector of the transistor 103. A resistor 121 is coupled between the terminal 118 and the collector of the transistor 103. It is to be noted that the leads 116 and 152 receive positive pulses from the corresponding shift registers and the leads 114 and 150 receive negative pulses from the corresponding shift registers.

A field effect transistor 123 has electrodes coupled between the lead 111 and the second input terminal of the differential amplifier 130 and a field effect transistor 125 has electrodes coupled between the lead 111 and the output lead 28. An inverting amplifier 127 is coupled to the write lead 114 and provides a positive pulse to the gate electrode of the field effect transistor 125 and a negative pulse to the gate electrode of the transistor 123. Thus, during writing in the selected line of elements, the transistor 123 is conductive and the transistor 125 is non-conductive. During reading of an element in a selected line, only the transistor 125 is conductive. To prevent other elements in a selected line from being read during writing and interferring with the feedback signal on the lead 111, a field effect transistor 129 has its electrodes coupled in the lead 150 and its gate electrode coupled to the positive or inverted output lead of the amplifier 127.

The system of FIG. 4 during writing of input data energizes the transistors 105 and 109 into conduction to provide a closed feedback loop through the differential amplifier 130. During reading, the transistor 109 is also biased into conduction to apply the sampled voltage to the lead 111 and through the transistor 125 to the output lead 28. It is to be noted that the buffer transistor 109 functions as a common source follower during both writing and reading and that the transistor 109 is conductive only when selected for writing or for reading.

The system of FIG. 4 may operate with concurrent or with sequential writing and reading of data. Although the gate 129 prevents reading from a selected line in which writing is occurring, this amount of information omitted in a large display, for example, has a relatively small effect. It is to be noted that in the system of FIG. 4, gates such as 129, 123 and 125 are provided for each line of elements in the array. The input terminal of the differential amplifier 130 is thus common to a conductive electrode of a plurality of transistors such as 123.

Figure 5:
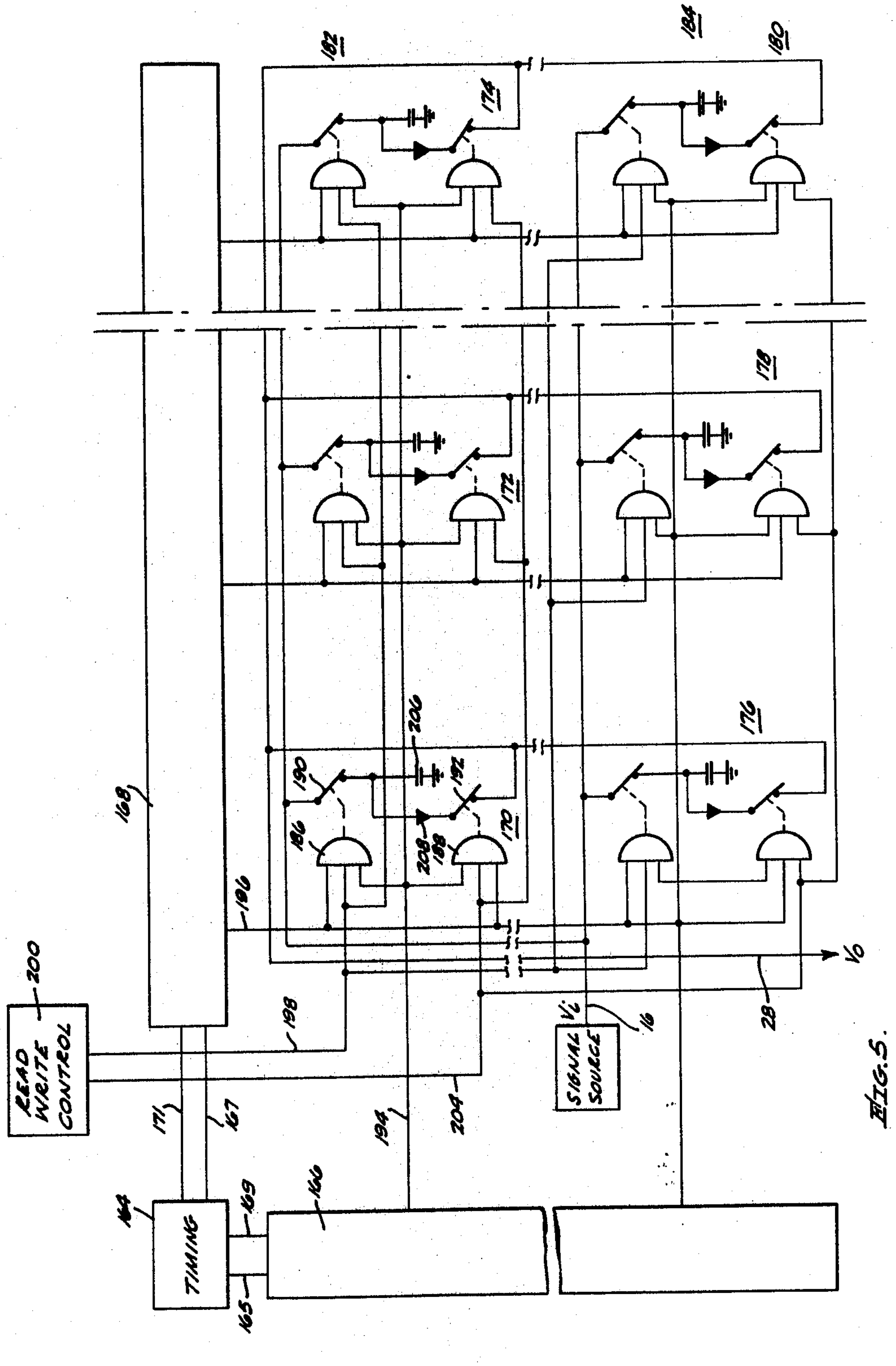
FIG. 5 is a schematic circuit and block diagram of a scan converter system in accordance with the invention operable with sequential writing and reading of data.

Referring now to FIG. 5, another arrangement of the scan conversion system in accordance with the principles of the invention is operable to sequentially write and read data such as recording data on the entire array and then reading the data either in the same or in an orthogonal dimension and at a selected rate relative to writing. Although the shift register combination of FIG. 5 prevents concurrent recording and reading, the storage element is applicable to other types of selection arrangements in accordance with the principles of the invention. A timing source 164 controls a line or vertical shift register 166 and an element or horizontal shift register 168, each of which may respond to synchronizing pulses on respective leads 165 and 167 and to clock pulses on respective leads 169 and 171. Lines 182 and 184 are shown respectively including storage elements 170, 172 and 174 and storage elements 176, 178 and 180. Each element such as 170 includes "AND" gates 186 and 188 respectively controlling write and read switches 190 and 192. The "AND" gate 186 responds to a line select pulse on a lead 194, to an element select pulse on a lead 196 and to a write pulse applied to a write control lead 198 from a read-write control source 200. The read "AND" gate 188 also responds to a coincidence of the line select pulse on the lead 194, the element select pulse on the lead 196 and a read control pulse applied to a lead 204 from the control source 200. For writing, the switch 190 connects an input lead 16 to one end of a storage capacitor 206 having the other end coupled to ground. During reading, the switch 192 connects the capacitor 206 through a buffer 208 to the output lead 28. The arrangement of FIG. 4, which requires only two shift registers, allows either writing or reading to be selected to proceed in either the horizontal or vertical dimension.

Figure 6:
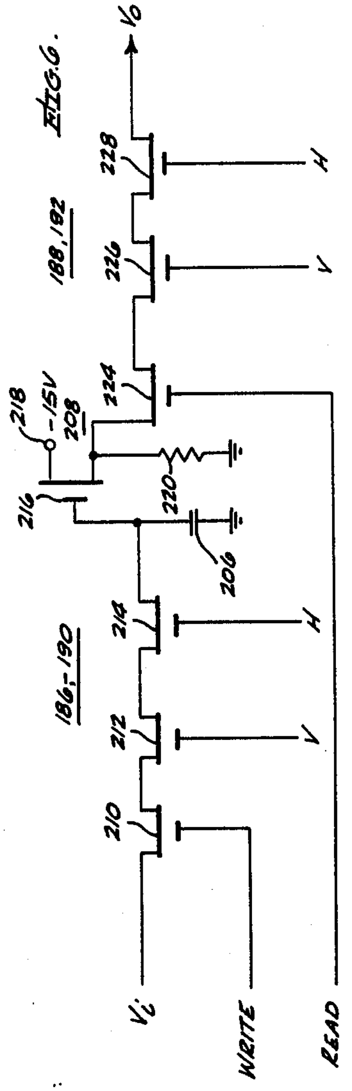
FIG. 6 is a schematic circuit diagram of a storage element that may be utilized in the system of FIG. 4.

Referring now also to FIG. 6 as well as to FIG. 5, a typical storage element such as 170 is shown in further detail. The "AND" gate 186 and the switch 190 may be formed of series connected field effect transistors 210, 212 and 214 with the source and drain electrodes coupled sequentially and respectively responsive at the gate electrodes thereof to the write control pulse, the vertical or line select pulse and the horizontal or element select pulse. The buffer 208 may include a field effect transistor 216 having a gate electrode coupled to the capacitor 206 and the series path of the transistor 214, a first electrode coupled to a −15 volt terminal 218 and a second electrode coupled to ground through a resistor 220. The "AND" gate 188 and switch 192 are formed from series connected field effect transistors 224, 226 and 228 respectively, responsive at their gate electrode to a read control pulse, a line select pulse and an element select pulse. In operation, the voltage $V_i$ is stored on the capacitor 206 during writing and the voltage $V_o$ is sampled from the capacitor 206 during reading with the buffer 208 preventing current flow from the capacitor 206. In the system of FIG. 5, writing may be performed in one dimension such as along the elements of selected lines in response to clock pulses and reading may be performed in the same or in an orthogonal dimension. When reading in the direction of repeating lines, for example, the shift register 166 may be sequentially energized in response to a clock pulse for each vertical column selected by the shift register 168.

Figure 7:
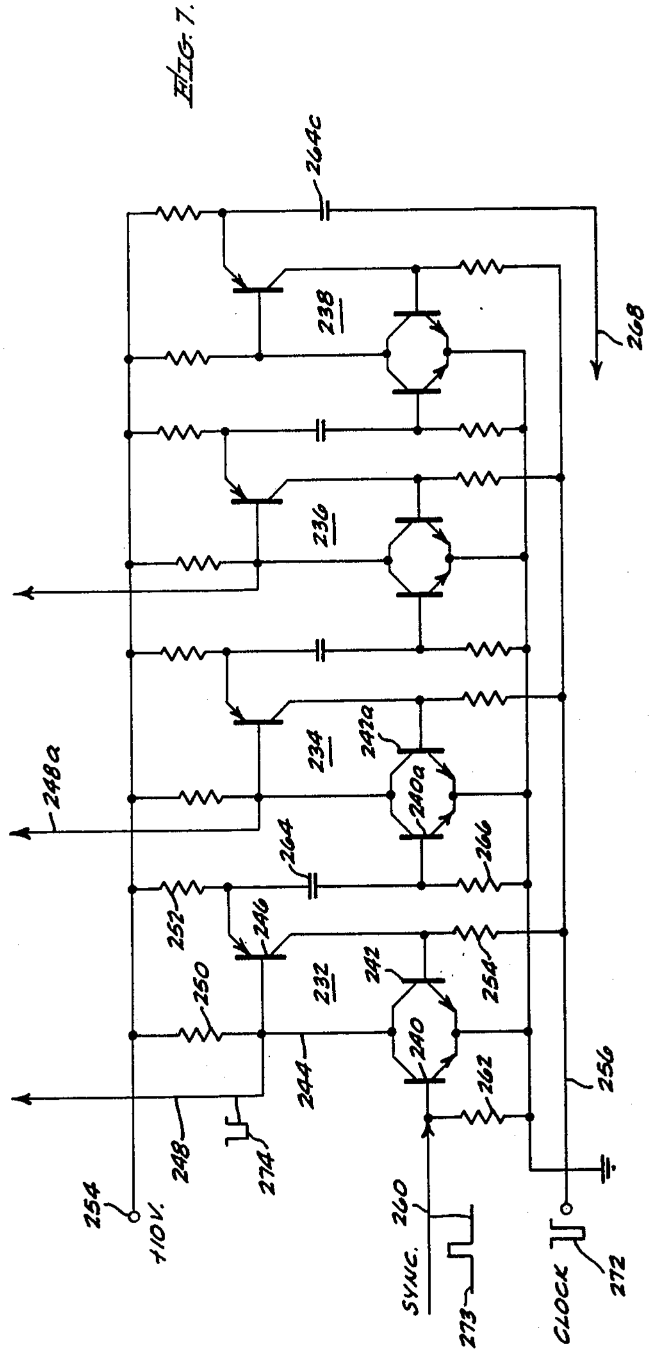
FIG. 7 is a schematic circuit diagram of a shift register that may be utilized in the system of the invention.

Referring now to FIG. 7, a typical shift register that may be utilized in the scan converters of the invention will be explained. Although only four stages 232, 234, 236 and 238 are shown in the illustrated shift register circuit, it is to be understood that any desired number of stages may be utilized in accordance with the principles of the invention. The first stage 232 includes first and second npn type transistors 240 and 242, each having an emitter coupled to ground and a collector coupled to a lead 244, which in turn is coupled to the base of a pnp type transistor 246 and to an output lead 248. Resistors 250 and 252 are respectively coupled from a +10 volt terminal 254 to the lead 244 and to the emitter of the transistor 246. The collector of the transistor 246 is coupled to the base of the transistor 242 and in turn through a resistor 254 to a clock lead 256. The base of the transistor 240 is coupled to a synchronizing lead 260 and through a resistor 262 to ground. The emitter of the transistor 246 is coupled through a capacitor 264 to the base of a transistor 240*a* of the stage 234, as well as through a resistor 266 to ground. In the last stage 238, the anode of a capacitor 264*c* may be coupled through a lead 268 to the timing source, for example, in systems where an indication of completion of a row or column is required.

In operation, the transistors 240, 242 and 246 are nonconductive when the stage 232 is in an unenergized condition. In response to a synchronizing pulse of a waveform 273, the transistor 240 is biased into conduction to form a negative output pulse of a waveform 274. At the same time, collector current from the transistor 240 causes the transistor 246 to be biased into conduction and a current flows from the collector thereof into the base of the transistor 242 to latch the two transistors 242 and 246 at the conductive state. The transistor 240 turns off in response to the next pulse of the waveform 272, the transistor 242 is biased out of conduction unlatching the transistor 246 and a positive spike is applied to the base of the transistor 240*a* to latch that stage into conduction. When the transistors 240*a* and 242*a* of the stage 234 are biased into conduction, a negative pulse is applied to an output lead 248*a* having a duration equal to the interval between clock pulses. The illustrated shift register is desirable because only a selected stage requires substantial current or power and all stages may be turned off in response to the clock pulse. The above circuit is of a type well known in the art. It is to be understood that other types of shift register circuits may be utilized in the manner described above.

Figure 8:
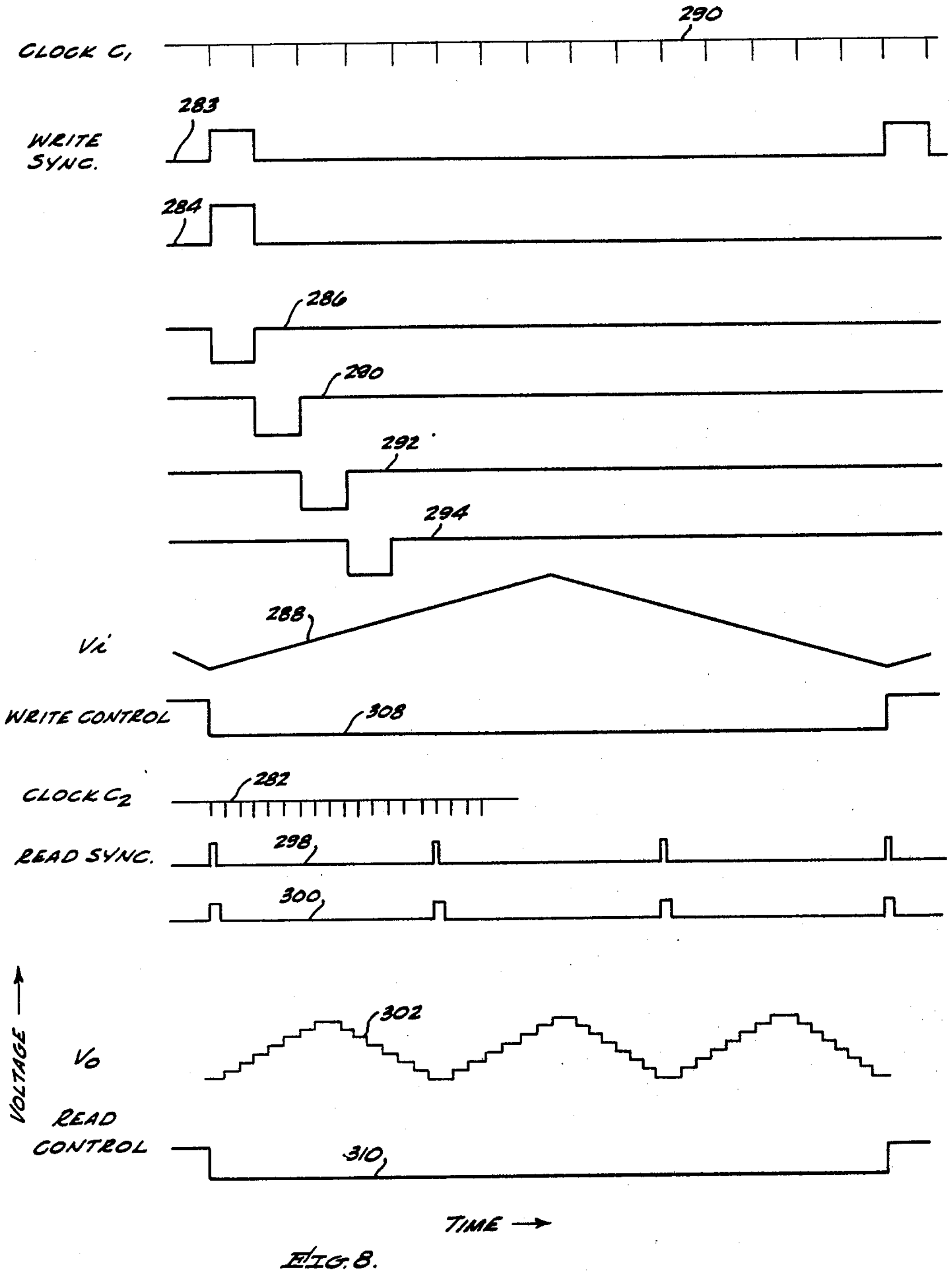
FIG. 8 is a schematic diagram showing voltage waveforms as a function of time for further explaining the scan converter systems of the invention.

Referring now to FIG. 8 as well as to FIG. 2, a clock signal $C_1$ of a waveform 280 may control the writing and a clock signal $C_2$ of a waveform 282 may control the reading at a substantially faster rate, for example. A vertical or line synchronizing pulse of a waveform 284 is applied to the lead 72 to select the first element. A similar pulse of a waveform 283 may be applied from the timing source 75 to the write shift register 36 and may be repeated to select a new line.

The first stage of the write shift register 38 is thus energized to apply the negative pulse of a waveform 286 to the element 46 to sample the signal $V_i$ of a waveform

288. During each subsequent clock period, pulses of waveforms 290, 292 and 294 are developed by sequentially advancing stages of the shift register 38 to sample different portions of the signal $V_i$. The shift registers 38, 40, 42 and 44 or the output leads of the shift registers 34 and 36 may include inverters (not shown) at the synchronizing input so that the negative pulses applied thereto are of the proper polarity, as shown. After the last element is sampled in the selected line, a pulse of the waveform 283 is applied to the shift register 36 to select the next line or any desired subsequent line or position. A synchronizing pulse similar to that of the waveform 284 may be applied to the lead 73 and writing is performed in response to clock pulses $C_1$ developing negative selection pulses at different stages of the shift register 42.

For reading in the same dimension, synchronizing pulses of a waveform 298 are applied to the shift register 34 which applies a pulse of a waveform 300 to a lead such as 74 or 77. The clock pulses of the waveform 282 develops a negative pulse at each stage of the shift register 40 to sample the stored data. The output signal $V_o$ of a waveform 302 is applied to the output lead 28.

For sampling in the vertical dimension, for example, each of the read registers 40 and 44 may be sequentially energized by pulses similar to the waveform 300 followed by a series of clock pulses $C_2$ applied to each shift register 40 and 44. Thus writing and reading may be reliably performed in the same or in different dimensions in accordance with the principles of the invention. Also, the writing and reading may be at the same speed or clock rate, or writing at a faster clock rate or a slower clock rate.

In the system of FIG. 3, the vertical or line write and read registers 84 and 86 receive respective synchronizing pulses 283 and 298 and the horizontal element write and read shift registers 88 and 90 receive similar synchronizing pulses. Clock pulses such as $C_1$ of the waveform 280 may be utilized for advancing the stages in the write shift register 88 and clock pulses of the waveform 282 may advance the read element shift register 90. The line shift registers 84 and 86 may either be advanced by continuously synchronizing pulses or by clock pulses $C_3$ and $C_4$ (not shown) which may be respectively similar to the waveforms 280 and 282. The system of FIG. 4 operates similar to that of FIG. 3.

In the system of FIG. 5, the operation is similar to that previously described with synchronizing pulses 283 controlling both shift registers 166 and 168 during writing in response to clock pulses similar to those of the waveform 280. During a reading period, synchronizing pulses of the waveforms 298 and 300, and the clock pulses of the waveform 282, control the shift registers 166 and 168. A write control pulse of a waveform 308 is applied to the line 198 during writing and a read control pulse of a waveform 310 is applied to the read control line 204 during reading.

The systems of FIGS. 3, 4 and 5, as well as of FIG. 2, are equally applicable to writing and reading in either dimension and with any speed or clock rate relation.

Thus, there has been described an improved and reliable scan converter system in which data may be reliably stored and read out either in the same or in a different dimension. The principles of the invention are applicable to operation with shift registers or delay lines or combinations thereof. The data may be read out at the same rate, at a slower rate or at a faster rate than utilized during writing. The storage elements are provided with consistent configurations for assembly as either printed circuit elements or integrated circuit elements. Different arrangements in accordance with the principles of the invention allow sequential writing and reading or concurrent writing and reading.

What is claimed is:

1. An analog memory system comprising:

a plurality of storage elements arranged in groups along a first dimension and a second dimension, said storage elements including a plurality of semiconductor devices;

first and second delay means coupled to said plurality of storage elements for sequentially energizing particular ones of said storage elements having predetermined first and second dimensions;

input means for providing analog signals to be stored by said storage elements;

output means, coupled to each of said storage elements, for providing output signals representing predetermined ones of the stored analog signals; and feedback means, operatively coupled to said input means and to each of said storage elements, for eliminating inaccuracies resulting from variations in the characteristics of said semiconductor devices included in the respective storage elements.

2. The memory system defined by claim 1 in which said first and second delay means respectively include first and second shift register means.

3. An analog memory system comprising:

a write horizontal shift register, a read horizontal shift register, a write vertical shift register, a read vertical shift register, a source of input signals, a differential amplifier coupled to said source of input signals, common output means, and a plurality of storage elements each including a capacitor, a write gate coupled to said vertical and horizontal write shift register, a read gate coupled to said vertical and horizontal read shift registers, gating means coupled to said differential amplifier, to said write gate and to said capacitor, buffer means coupled to said capacitor, first switching means coupled to said buffer means, to the input of said differential amplifier and to said write gate, and second switching means coupled to said read gate, to said buffer means and to said common output means.

4. An analog memory system comprising a write horizontal shift register, a read horizontal shift register, a write vertical shift register, a read vertical shift register, a source of input signals, differential amplifier means having first and second input terminals with said first terminal coupled to said source of input signals, output means, a plurality of storage elements each coupled to said write horizontal and vertical shift registers and to said read horizontal and vertical shift registers for being selected for writing or for reading, a common conductor coupled to said plurality of storage elements, first gating means coupled to said common conductor and to the second input terminal of said differential amplifier means, second gating means coupled to said common conductor and to said output means, and third gating means coupled between said read vertical shift register and said plurality of elements and to said write vertical shift register for inhibiting reading of said elements during writing of input signals therein.

5. An analog memory system comprising a write horizontal shift register having a plurality of output leads, a read horizontal shift register having a plurality of output leads, a write vertical shift register having a plurality of output leads, a read vertical shift register having a plurality of output leads, a source of input signals, common output means, differential amplifier means having first and second input terminals and an output terminal with said first input terminal coupled to said source of input signals, a plurality of storage elements arranged in horizontal rows each element including a capacitor, write gating means coupled to a selected lead of said write horizontal shift register and to a selected lead of said write vertical shift register and between the output terminal of said differential amplifier means and said storage capacitor, and read gating means coupled to a selected lead of said read horizontal shift register and to a selected lead of said read vertical shift register and between said capacitor and said common output means.

6. The system defined by claim 5 in which a source of synchronizing pulses is coupled to said write and read horizontal shift registers and to said write and read vertical shift registers for energizing the first stages of said shift registers and in which a source of clock pulses is coupled to each of said shift registers for energizing stages subsequent to said first stages.

7. The memory system defined by claim 1 wherein said feedback means includes a differential amplifier having first and second input leads and an output lead wherein said first input lead is coupled to said input means, said output lead is coupled to each of said storage elements for applying thereto said analog signals to be stored, and said second input lead is coupled to each of said storage elements for providing a feedback signal to said differential amplifier.

8. The memory system defined by claim 7 wherein said differential amplifier serves to provide an output signal over said output lead, said output signal having a magnitude that is proportional to the difference between the magnitudes of the respective signals applied to said differential amplifier over said first and second input leads.

References Cited

UNITED STATES PATENTS

| | | | |
|---|---|---|---|
| 3,015,091 | 12/1961 | Nyberg et al. | 340—174 |
| 3,373,295 | 3/1968 | Lambert | 340—173 X |
| 3,388,268 | 6/1968 | Murphre | 307—238 |
| 3,388,292 | 6/1968 | Burns | 340—173 X |
| 3,395,292 | 7/1968 | Bogert | 307—304 X |

BERNARD KONICK, Primary Examiner

J. F. BREIMAYER, Assistant Examiner

U.S. Cl. X.R.

307—238, 304